(No Model.)

H. C. ROBINSON & L. J. LALLEMENT.
SEPARABLE BUTTON.

No. 298,236. Patented May 6, 1884.

Attest:
Charles Pickles
Geo. Wheelock

Inventors:
Harold C. Robinson
Louis J. Lallement
By Knight Bros
Attys.

UNITED STATES PATENT OFFICE.

HAROLD C. ROBINSON AND LOUIS J. LALLEMENT, OF ST. LOUIS, MO.

SEPARABLE BUTTON.

SPECIFICATION forming part of Letters Patent No. 298,236, dated May 6, 1884.

Application filed September 19, 1883. (No model.)

*To all whom it may concern:*

Be it known that we, HAROLD C. ROBINSON and LOUIS J. LALLEMENT, both of the city of St. Louis, in the State of Missouri, have invented a certain new and useful Improvement in Separable Buttons, of which the following is a full, clear, and exact description, reference being had to the accompanying drawings, forming part of this specification, and in which—

Figure 1:
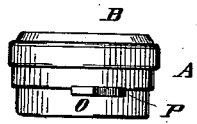
Figure 2:
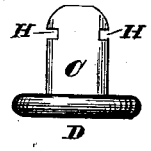
Figure 5:
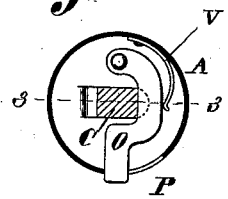
Figure 3:
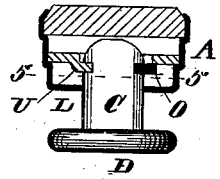
Figure 6:
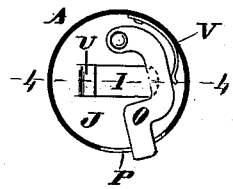
Figure 4:
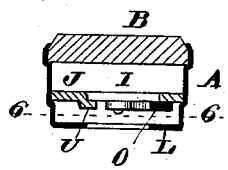

Figure 1 is a side elevation of the outer or body part of the button. Fig. 2 is a similar view of the shank. Fig. 3 is a section of the body taken on line 3 3, Fig. 5, showing the shank in side view. Fig. 4 is a similar view taken on line 4 4, Fig. 6, the shank being removed. Fig. 5 is a transverse section taken on line 5 5, Fig. 3; and Fig. 6 is a similar view taken on line 6 6, Fig. 4.

Our invention relates to a separable button; and our invention consists in features of novelty hereinafter fully described, and pointed out in the claims.

Referring to the drawings, A represents the outer or body part of the button, which may be provided with any desirable kind of a set, B.

C represents the shank with a suitable head, D. It is provided with notches H near its inner end; or, if it is made round instead of flat, as shown, the notches would consist of a circumferential groove. The inner end of the shank fits in an opening or perforation, I, in the bottom or inner wall, J, of the body of the button. This bottom may be, and preferably is, covered by an outer wall or auxiliary bottom, L, as shown, through which the shank would also pass.

O represents a lever pivoted to the bottom J, its free end extending out through a slot or opening, P, in the side wall of the body of the button.

U represents a lip formed upon or secured to the bottom J, to engage one side or edge of the shank of the button when the two parts are put together. The other side or edge of the shank is engaged by the lever O, as shown in Figs. 3 and 5, and the lever is held into engagement with the shank by a suitable spring, V. (See Figs. 5 and 6.)

To put the button together, the shank is inserted into the body as described, its inner end coming against and forcing the lever back into the position shown in Fig. 6, allowing the end of the shank to enter the opening I of the bottom J, and as soon as it has entered far enough the spring acts to engage the lever with one side of the shank and to force the shank over, engaging it with the lip U. Then, to separate the button, the free end of the lever is simply pulled back to the position shown in Fig. 6, when the shank can be pulled out.

We claim as our invention—

1. In a separable button, the combination of a body having an inner wall formed with an opening and a lip projecting across the opening, a lever hinged to the wall in the same plane as the lip, to turn on the wall, and extending through an opening in the side of the body, and a shank recessed to receive the lip and lever, as set forth.

2. In a separable button, the combination of a body having an inner wall formed with an opening to receive a shank, and a lip to fit a recess in the shank, a lever hinged to the wall extending through the body, to form a handle and to fit a recess in the shank opposite to the lip-recess, and a spring to insert the lever in its recess, as set forth.

3. In a separable button, the combination of a body, A, having an opening to receive a shank, an inner wall, J, having a lip, U, and opening to receive the inner end of the shank, a lever, O, hinged to the wall, having its end projecting through the body, a spring, V, to press the lever inward, and a shank, C, having recesses to fit the lip and lever, as set forth.

HAROLD C. ROBINSON.
LOUIS J. LALLEMENT.

In presence of—
GEO. H. KNIGHT,
EDW. E. ISRAEL.